(12) United States Patent
Schiffman et al.

(10) Patent No.: US 11,137,948 B2
(45) Date of Patent: Oct. 5, 2021

(54) USER EQUIPMENT TO CAPTURE IDENTITY INFORMATION FROM RENDERING APPARATUSES

(71) Applicant: Hewlett-Packard Development Company, L.P., Spring, TX (US)

(72) Inventors: Joshua Serratelli Schiffman, Bristol (GB); Luke T. Mather, Bristol (GB); Boris Balacheff, Meudon (FR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/628,755

(22) PCT Filed: Jul. 13, 2018

(86) PCT No.: PCT/US2018/041941
§ 371 (c)(1),
(2) Date: Jan. 6, 2020

(87) PCT Pub. No.: WO2019/018216
PCT Pub. Date: Jan. 24, 2019

(65) Prior Publication Data
US 2020/0293234 A1  Sep. 17, 2020

(30) Foreign Application Priority Data
Jul. 17, 2017 (EP) .................................... 17305947

(51) Int. Cl.
*G06F 3/12* (2006.01)
*G06F 21/60* (2013.01)

(52) U.S. Cl.
CPC .......... *G06F 3/1204* (2013.01); *G06F 3/1222* (2013.01); *G06F 3/1226* (2013.01); *G06F 3/1238* (2013.01); *G06F 21/608* (2013.01)

(58) Field of Classification Search
None
See application file for complete search history.

(56) References Cited

U.S. PATENT DOCUMENTS 8,291,029 B2  10/2012  Asthana et al.
8,744,365 B2   6/2014  Kim et al.
(Continued)

FOREIGN PATENT DOCUMENTS

| CN | 103257835 | 8/2013 |
| CN | 106878917 | 6/2017 |
| EP | 2928172 | 10/2015 |

OTHER PUBLICATIONS

Pusey, Jordan, "Setting Up Proximity Printing with Citrix", Mar. 30, 2016, Retrieved from the Internet: https://www.printerlogic.com/blog/setting-proximity-printing-citrix/.
(Continued)

*Primary Examiner* — Henok Shiferaw
(74) *Attorney, Agent, or Firm* — Tong Rea Bentley & Kim LLC

(57) ABSTRACT

User equipment, the user equipment to receive data representing identity information broadcast by a rendering apparatus over a passive non-contact short proximity data transport mechanism when the user equipment is proximate the rendering apparatus, and push the gathered identity information to a workstation, to enable the workstation to connect with the rendering apparatus.

13 Claims, 4 Drawing Sheets

(56) References Cited

U.S. PATENT DOCUMENTS

| | | | |
|---|---|---|---|
| 9,367,271 B2 | 6/2016 | Zehler et al. | |
| 9,503,592 B2 | 11/2016 | Fein et al. | |
| 2007/0066293 A1 | 3/2007 | Peng et al. | |
| 2011/0040862 A1* | 2/2011 | Nakajima | H04L 67/125 709/223 |
| 2013/0027741 A1* | 1/2013 | Liu | G06F 3/1204 358/1.15 |
| 2013/0141755 A1 | 6/2013 | Miller et al. | |
| 2014/0093079 A1* | 4/2014 | Scott | H04W 12/06 380/270 |
| 2015/0215973 A1* | 7/2015 | Nguyenvan | H04W 76/36 370/329 |
| 2015/0378296 A1* | 12/2015 | Kim | H04N 1/4433 399/80 |
| 2016/0080200 A1* | 3/2016 | Ishii | H04L 61/2069 709/211 |
| 2016/0274828 A1* | 9/2016 | Oshima | G06F 3/1205 |
| 2016/0381245 A1* | 12/2016 | Hirota | H04N 1/32625 358/1.15 |
| 2017/0134606 A1* | 5/2017 | Kim | H04W 4/023 |
| 2017/0192727 A1* | 7/2017 | Yun | G06F 3/1217 |
| 2018/0349080 A1* | 12/2018 | Oikawa | G06F 9/5083 |

OTHER PUBLICATIONS

Wireless Guide for Zebra® Bluetooth-enabled Printers, Dec. 21, 2015 < https://www.zebra.com/content/dam/zebra/manuals/en-us/networking/bluetooth-ug-en.pdf >.

* cited by examiner

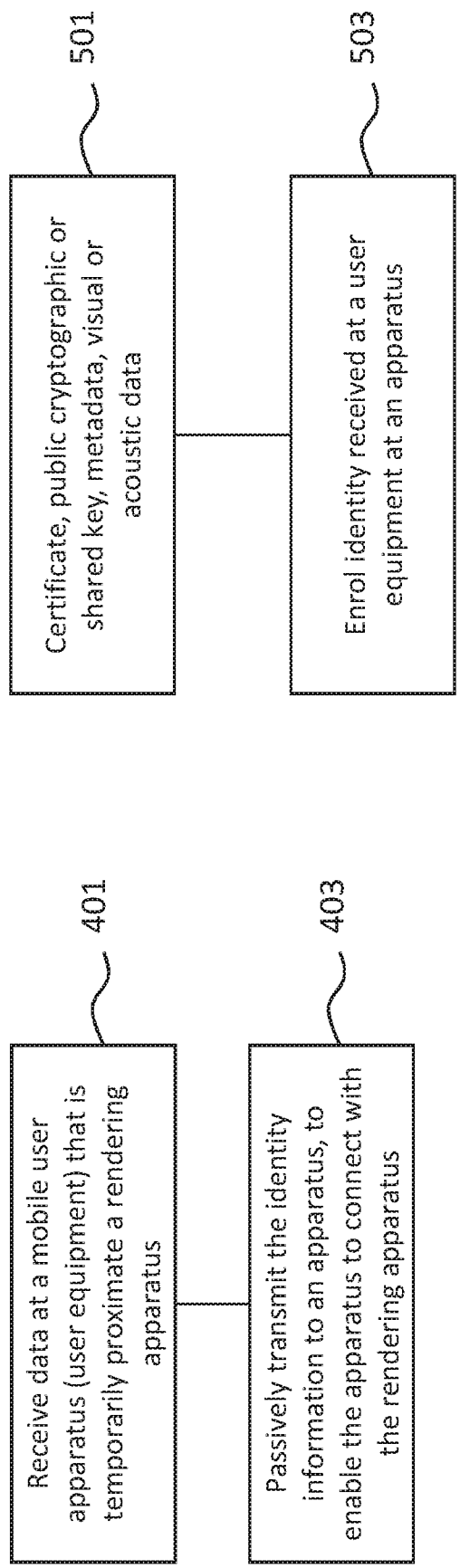
Figure 5
Figure 4
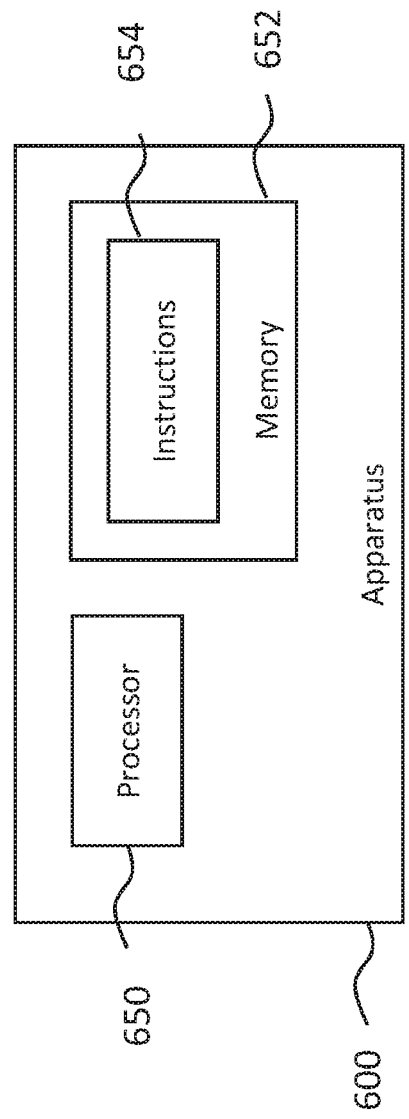
Figure 6

USER EQUIPMENT TO CAPTURE IDENTITY INFORMATION FROM RENDERING APPARATUSES

BACKGROUND

An IT department can manage the identities of rendering apparatus, such as 2D and 3D printers for example, and a pull-print process exists in which a user's print job is held on a server or a user's workstation and released by the user at a printing device, users manually enrol identities of rendering apparatus onto a workstation.

BRIEF DESCRIPTION OF THE DRAWINGS

Various features of certain examples will be apparent from the detailed description which follows, taken in conjunction with the accompanying drawings, which together illustrate, by way of example only, a number of features, and wherein:

FIG. 4 is a flow chart of a method according to an example;

FIG. 5 is a flow chart of a method according to an example; and

FIG. 6 is a schematic representation of an apparatus comprising a processor associated with a memory according to an example.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

To manually enrol an identity of a rendering apparatus, such as a printer, which may be a 2D or 3D printer for example, a user can locate information on or near the apparatus that can then be recorded by the user and entered to a user workstation.

In some cases, a rendering apparatus can be network addressable from a workstation. However, the apparatus may not be physically suitable for or reachable by the user. In an example, a user can capture identity information of closely spatially located apparatus. Accordingly, the probability of a user selecting an inappropriate printer is reduced.

According to an example, there is provided a method for gathering identity certificates of rendering apparatus using a short proximity transport mechanism. A physical proximity of the collection process enables rendering apparatus that are nearby the user to be detected. In an example, a strong cryptographic binding to the apparatus can be delivered to user equipment, such as user's mobile device for example. These certificates can then be provided to the user's workstation from the user equipment to enrol a rendering apparatus and complete the setup process.

Accordingly, user equipment can be used to to passively capture identities broadcast by rendering apparatus over a short proximity transport mechanism, which can be a low energy radio frequency wireless communication mechanism, peer-to-peer network radio or physical medium (image/sound) for example.

Figure 1:
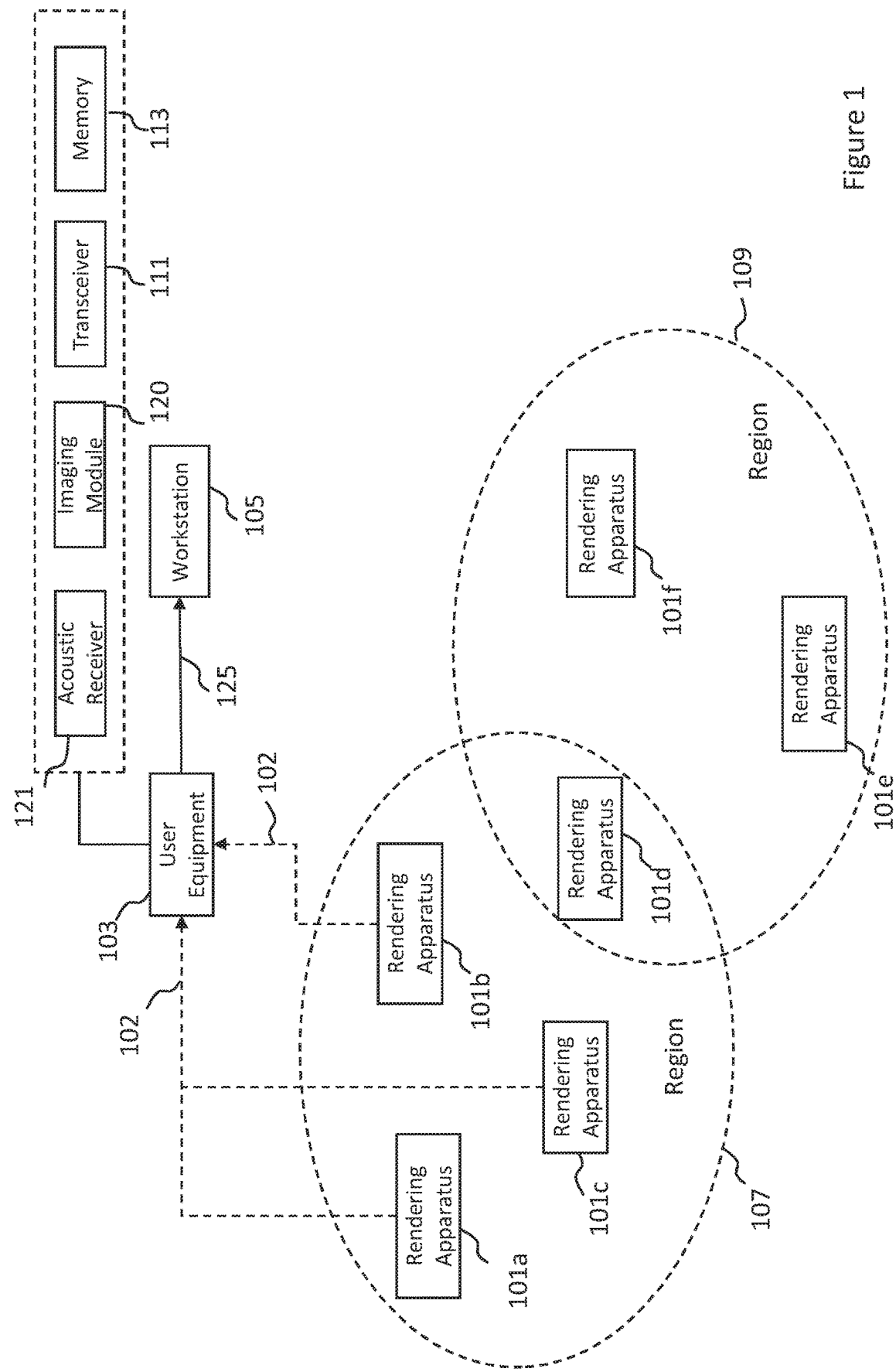
FIG. 1 is a schematic representation of a system according to an example.

FIG. 1 is a schematic representation of a system according to an example. In an example, user equipment 103 can be a mobile device such as a smart phone, PDA, tablet and so on. User equipment 103 can receive data 102 representing identity information broadcast by a rendering apparatus 101a-c. In the example of FIG. 1, user equipment 103 receives data from three such rendering apparatus, 101a-c, which are located in a region 107. The data can be received by the user equipment 103 over a passive non-contact short proximity data transport mechanism when the user equipment 103 is proximate the rendering apparatus.

User equipment 103 can push the gathered identity information 102 to a workstation 105, to enable the workstation to 105 connect with the rendering apparatus 101a-c. In an example, the user equipment 103 can passively push the data 102 to the workstation 105 or the workstation 105 can poll or query the user equipment 103 for the data 102.

According to an example, the passive non-contact short proximity data transport mechanism can be a low energy radio frequency communication mechanism, such as Bluetooth low energy for example. The user equipment 103 can comprise a transceiver 111 to receive data 102 using such a mechanism and transmit data, such as to workstation 105 for example.

In an example, rendering apparatus 101a-f can broadcast their identity over any low-power broadcast protocol. However, such identities can also be displayed on a display of the apparatus, such as an LCD display for example, or can be broadcast via audio. Accordingly, transceiver 111 may be replaced by or augmented with an imaging module 120 to capture image data representing the identity information of the rendering apparatus, and/or an acoustic receiver 121 to receive audio data representing the identity information of the rendering apparatus.

In an example, an identity can take the form of a X.509 certificate for use with TLS, or in the form of a public key, a pre-shared key for use with TLS PSK suites, and any suitable metadata.

According to an example, as a user walks around a location, such as n office in their normal course of work for example, the user equipment 103 can passively capture the identity of one or more rendering apparatus 101a-f and store it internally in a memory 113. In the example of FIG. 1 for example, user equipment 103 is proximate rendering apparatus 101a-c to enable an identity broadcast of these apparatus to be received by user equipment 103 using any of the mechanisms described above. Rendering apparatus 101d is in the same region 107 as rendering apparatus 101a-c, but may be located behind a door for example. Therefore, although it may appear (e.g. based on network addressability of apparatus 101d) to be a suitable candidate for use with workstation 105, it may in fact be inaccessible to the user and so any print job sent to the apparatus may be difficult to retrieve.

Since the user equipment 103 is unable to come within range of a broadcast of apparatus 101d given its location behind a door for example, the user equipment does not receive identity information for this apparatus. The same is true for rendering apparatus 101e and 101f in region 109. They may appear (e.g. based on network addressability) to be suitable, but the region 109 may be inaccessible to a user.

When the user returns to their desk for example, the user equipment can passively transport all captured identities and enroll them at the workstation 105. For example, using transceiver 111, captured identity data can be transmitted 125 to workstation 105 using a wireless data transport mechanism such as wifi or Bluetooth and so on. Alternatively, user equipment 103 may communicate a captured identity to workstation 105 over a wired link between the user equipment and the workstation.

According to an example, multiple rendering apparatus can act as a mesh network, and periodically poll nearby apparatus for new identities. In this manner, rendering apparatus can aggregate sets of identities, and a user can therefore encounter an increases probability that they will capture a suitable identity.

Figure 2:
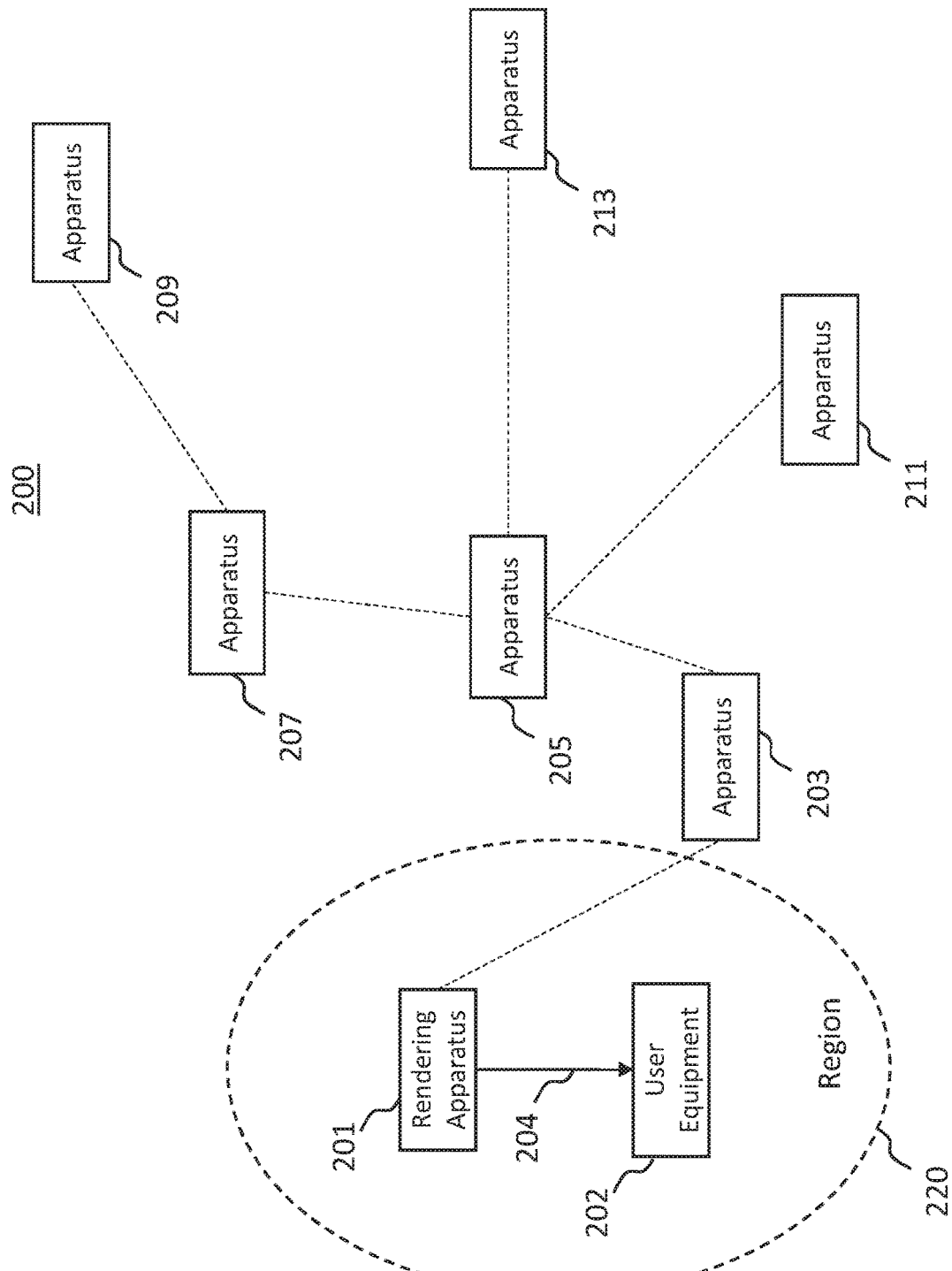
FIG. 2 is a schematic representation of a mesh network according to an example.

FIG. 2 is a schematic representation of a mesh network according to an example. User equipment 202 in region 220 receives an identity 204 from rendering apparatus 201. Other apparatus shown in FIG. 2 are not within range of user equipment 202. However, apparatus 201 can poll apparatus 203 for its identity along with the identity of any other rendering apparatus that it (203) is in contact with, which in the example, of FIG. 2 is apparatus 205. Apparatus 205 is in contact with apparatus 207, 211 and 213, and apparatus 207 is in contact with apparatus 209. Accordingly, a mesh network is formed in which apparatus 203 may ultimately pass the identities of itself and apparatus 205, 207, 209, 211 and 213 to apparatus 201. When user equipment 202 receives the data 204 it may comprise the identities of the other apparatus in the network 200.

In an example, any captured cryptographic material received as part of an identity can be used in a secure printing protocol. For example, to encrypt a print job under a printer's key.

Figure 3:
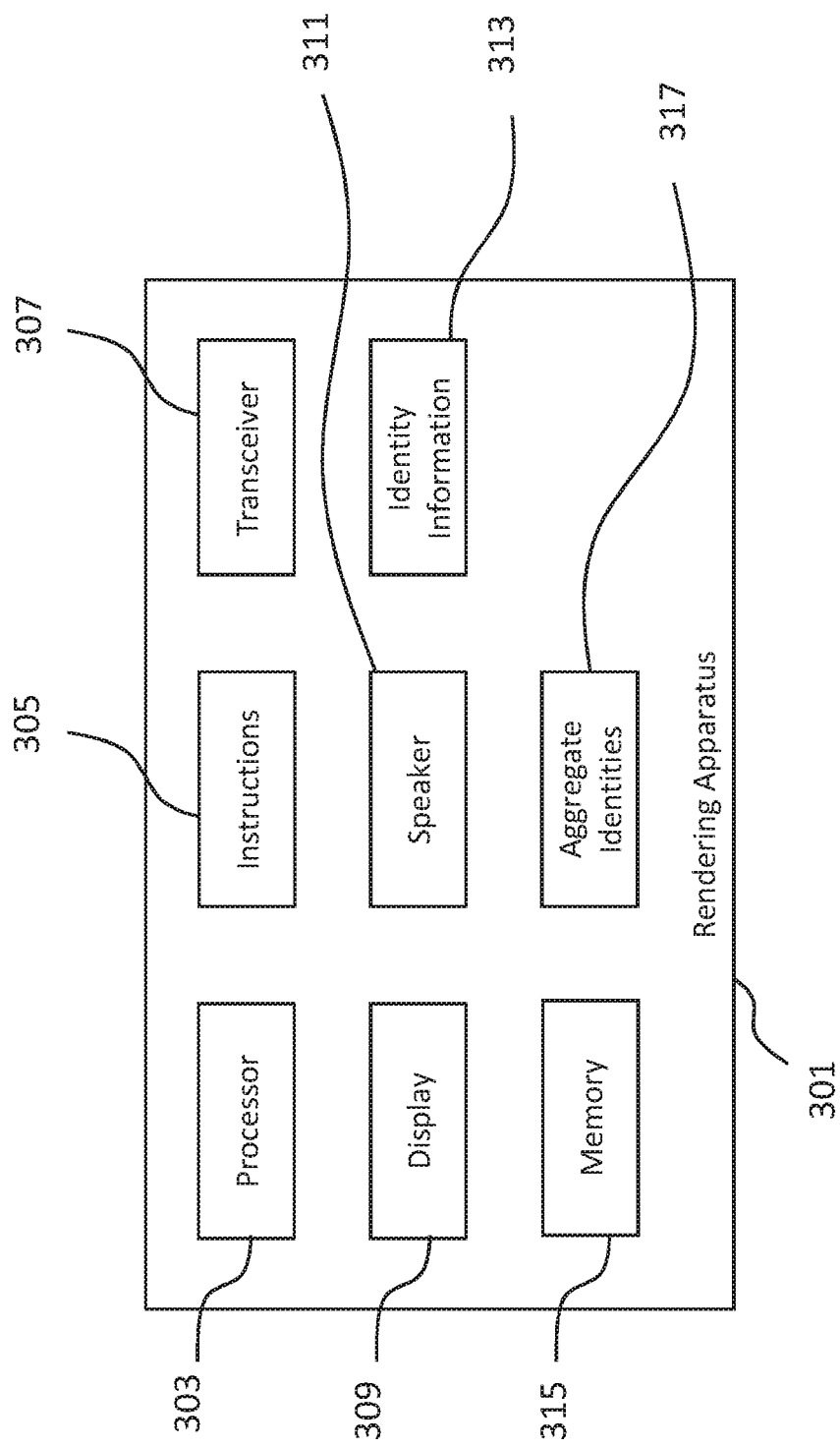
FIG. 3 is a schematic representation of a rendering apparatus according to an example.

FIG. 3 is a schematic representation of a rendering apparatus according to an example. Rendering apparatus 301 can be a printer, such as a 2D or 3D printer for example. In an example, the apparatus 301 comprises a processor 303. The processor 303 is configured to execute instructions 305 to generate or receive data representing identity information of the rendering apparatus. For example, the apparatus can be configured to receive an identity at time of deployment which can be subsequently modified or updated, such as if the apparatus is moved within an environment for example. The processor 303 can execute instructions 305 to generate identity information for the apparatus 301. In either case, the identity information can be broadcast by the apparatus 301 using a passive non-contact short proximity data transport mechanism of the rendering apparatus.

In an example, apparatus 301 comprises a transceiver 307 to enable the apparatus 301 to broadcast its identity over a low-power broadcast protocol. In addition, or in place of the use of transceiver 307 to broadcast an identity, the apparatus can display an identity on a display 309 of the apparatus, such as an LCD display for example, or can broadcast an identity via audio using a speaker 311 for example. Accordingly, transceiver 307 may be replaced by or augmented with a display 309 and/or an acoustic transmitter 311.

According to an example, identity information 313, which may be generated or received by apparatus 301, can be a certificate, public cryptographic or shared key, metadata, visual or acoustic data. In an example, apparatus 301 comprises a memory 315 to store data representing a set of aggregate identities of multiple other rendering apparatus along with the identity 313 for example. With reference to FIG. 2, identify data of multiple other rendering apparatus can be stored in memory 307 and can be broadcast by apparatus 301. The apparatus 301 can therefore poll multiple other rendering apparatus for their respective identity information to generate a set of aggregate identities 317.

FIG. 4 is a flow chart of a method according to an example. In block 401 data is received at a mobile user apparatus (user equipment) that is temporarily proximate a rendering apparatus. For example, a user equipment can pass a rendering apparatus as a user holding the equipment walks past it. The apparatus may be continuously or intermittently broadcast its identity information to enable devices to easily enrol the apparatus at a workstation. That is, the apparatus can broadcast data representing identity information of the rendering apparatus using a passive non-contact short proximity data transport mechanism as described above. In block 403, the user equipment can passively transmit the identity information to an apparatus (such as a workstation for example), to enable the apparatus to connect with the rendering apparatus.

Accordingly, as user equipment passes a rendering apparatus, it can receive data broadcast from the rendering apparatus that provides identity information of the rendering apparatus. The data may also include identity information of one or more other rendering apparatus as described above with reference to FIG. 2 for example. The user equipment can store the data. When the user equipment is within communication range of a workstation, for example, or linked to the workstation using a cable or dock and so on, it can push the data representing the identity information of the one or more rendering apparatus to the workstation in order to enable the rendering apparatus to be enrolled at the workstation.

Therefore, a user can gain access to one or more rendering apparatus without having to manually enrol them. Furthermore, usability of rendering apparatus is increased since the probability of a user finding a suitable apparatus without having to do any explicit discovery work themselves is increased. In an example therefore, a user, potentially, does not have to perform any interactions at all.

In an example, the identity information can be transmitted from user equipment to a workstation over a second data transport mechanism. The second data transport mechanism can be the same as or different to the mechanism used to receive the identity information from a rendering apparatus.

FIG. 5 is a flow chart of a method according to an example. In block 503, an identity received at a user equipment as a certificate, public cryptographic or shared key, metadata, visual or acoustic data (block 501) is enrolled (503) at an apparatus such as a workstation for example. As noted above, the identity can be pushed to the workstation using a wireless or wired link. In an example, the workstation may poll user equipment for any new identity information data.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of a user equipment or rendering apparatus may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode.

For example, the instructions may be provided on a non-transitory computer readable storage medium encoded with instructions, executable by a processor.

FIG. 6 shows an example of an apparatus 600 comprising a processor 650 associated with a memory 652. The apparatus may be user equipment or a rendering apparatus, as described above. The memory 652 comprises computer readable instructions 654 which are executable by the processor 650. The instructions 654 can comprise one or more of:

Instructions to receive data, at a mobile user apparatus temporarily proximate the rendering apparatus, representing identity information broadcast by the rendering apparatus over a passive non-contact short proximity data transport mechanism;

Instruction to passively transmit the identity information to an apparatus, to enable the apparatus to connect with the rendering apparatus;

Instructions to transmit identity information from a rendering apparatus, periodically or continuously; and Instructions to poll a rendering apparatus for identity information.

Such machine-readable instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. User equipment, the user equipment to:
receive data representing identity information broadcast by a rendering apparatus over a passive non-contact short proximity data transport mechanism when the user equipment is proximate the rendering apparatus;
store the identity information in a memory of the user equipment;
communicatively couple the user equipment to a workstation; and
push the identity information that is gathered to the workstation in response to the user equipment being communicatively coupled to the workstation via a wifi connection or a wired link that is different from the passive non-contact short proximity data transport mechanism, to enable the workstation to connect with the rendering apparatus.

2. The user equipment as claimed in claim 1, further comprising a memory to store data representing multiple rendering apparatuses.

3. The user equipment as claimed in claim 1, further comprising an imaging module to capture image data representing the identity information of the rendering apparatus.

4. The user equipment as claimed in claim 1, further comprising an acoustic receiver to receive audio data representing the identity information of the rendering apparatus.

5. A method for determining the identity of a rendering apparatus, the method comprising:
receiving data, at a mobile user apparatus temporarily proximate to the rendering apparatus, representing identity information broadcast by the rendering apparatus over a passive non-contact short proximity data transport mechanism;
storing the identity information in a memory of the mobile user apparatus;
communicatively coupling the mobile user apparatus to an apparatus via a wifi connection or a wired link that is different from the passive non-contact short proximity data transport mechanism; and
passively transmitting the identity information to the apparatus over the wifi connection or the wired link in response to the user equipment being communicatively coupled to the apparatus, to enable the apparatus to connect with the rendering apparatus.

6. The method as claimed in claim 5, wherein the identity information is a certificate, public cryptographic or shared key, metadata, visual data, or acoustic data.

7. The method as claimed in claim 5, further comprising:
enrolling the identity information at the apparatus.

8. The method as claimed in claim 5, further comprising:
receiving the identity information at the rendering apparatus from multiple other rendering apparatuses.

9. The method as claimed in claim 8, further comprising:
polling the multiple other rendering apparatuses for their respective identity information.

10. The method as claimed in claim 8, further comprising:
aggregating the identity information from the multiple other rendering apparatus to generate a set of identities.

11. A rendering apparatus comprising a processor to execute instructions to:
- generate or receive data representing identity information of the rendering apparatus;
- broadcast the data using a passive non-contact short proximity data transport mechanism of the rendering apparatus to a user equipment; and
- connect with a workstation via a wifi connection or a wired link that is different from the passive non-contact short proximity data transport mechanism using the identity information received by the workstation from the user equipment, wherein the identity information is stored in a memory of the user equipment and pushed to the workstation in response to being communicatively coupled to the workstation.

12. The rendering apparatus as claimed in claim 11, further comprising a memory to store data representing a set of aggregate identities of multiple other rendering apparatus.

13. The rendering apparatus as claimed in claim 12, the rendering apparatus to poll the multiple other rendering apparatus for their respective identity information to generate the set of aggregate identities.

\* \* \* \* \*